United States Patent
Origane et al.

(10) Patent No.: US 9,263,889 B2
(45) Date of Patent: Feb. 16, 2016

(54) POWER SUPPLY DEVICE

(71) Applicants: Toshinori Origane, Aichi (JP); Masayuki Miyashita, Aichi (JP); Kazushi Kodaira, Aichi (JP); Shinji Horio, Aichi (JP)

(72) Inventors: Toshinori Origane, Aichi (JP); Masayuki Miyashita, Aichi (JP); Kazushi Kodaira, Aichi (JP); Shinji Horio, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 445 days.

(21) Appl. No.: 13/763,230

(22) Filed: Feb. 8, 2013

(65) Prior Publication Data
US 2013/0200699 A1 Aug. 8, 2013

(30) Foreign Application Priority Data

Feb. 8, 2012 (JP) ................................ 2012-024683

(51) Int. Cl.
- H02J 1/04 (2006.01)
- B60R 16/03 (2006.01)
- F02N 11/08 (2006.01)
- F02N 11/10 (2006.01)
- H02M 3/155 (2006.01)

(52) U.S. Cl.
CPC . H02J 1/04 (2013.01); B60R 16/03 (2013.01); F02N 11/087 (2013.01); F02N 11/0814 (2013.01); F02N 11/10 (2013.01); *F02N 2011/0888* (2013.01); *F02N 2250/02* (2013.01); *H02M 3/155* (2013.01); *Y02T 10/48* (2013.01)

(58) Field of Classification Search
CPC .......... H02J 1/04; F02N 11/10; F02N 11/087; F02N 11/0814
See application file for complete search history.

(56) References Cited

U.S. PATENT DOCUMENTS 4,624,335 A * 11/1986 Shiraishi et al. ............... 180/422
4,926,281 A *  5/1990 Murphy ........................... 361/55

(Continued)

FOREIGN PATENT DOCUMENTS

DE 102008031270 A1 1/2010
JP H05-241659 A 9/1993

(Continued)

OTHER PUBLICATIONS

Office Action issued in corresponding German Application No. 102313002244.4, mailed on Feb. 12, 2015 (9 pages).

(Continued)

*Primary Examiner* — Thienvu Tran
*Assistant Examiner* — Pinping Sun
(74) *Attorney, Agent, or Firm* — Osha Liang LLP

(57) ABSTRACT

The present invention provides a power-supply device, which can continuously supply a voltage from a power supply to a load even if a breakdown of a circuit is generated. The power-supply device includes a booster circuit, a normally-closed bypass relay, a CPU, and a switching circuit. A first switch of the switching circuit is turned on by a switching signal from the CPU, and a second switch is turned on by a boosting request signal from a boosting request signal generator. In the case that one of or both the switching signal and the boosting request signal are not input to the switching circuit 14, because a coil of a bypass relay is not energized, a contact turns on, and a voltage is supplied from a DC power supply to the load through the contact. When both the switching signal and the boosting request signal are input to the switching circuit, the coil is energized to turn off the contact, and a voltage supply path to the load is switched from the side of the bypass relay to the side of the booster circuit.

6 Claims, 17 Drawing Sheets

(56) References Cited

U.S. PATENT DOCUMENTS

| | | | |
|---|---|---|---|
| 6,259,306 B1 * | 7/2001 | Brulhart et al. | 327/436 |
| 2011/0127936 A1 * | 6/2011 | Ogasawara | 318/400.3 |

FOREIGN PATENT DOCUMENTS

| | | | | |
|---|---|---|---|---|
| JP | 2005-112250 A | | 4/2005 | |
| JP | 2005-160284 A | | 6/2005 | |
| JP | 2005160284 A | * | 6/2005 | H02M 3/155 |
| JP | 2010-183755 A | | 8/2010 | |
| JP | 2011-162065 A | | 8/2011 | |

OTHER PUBLICATIONS

Patent Abstracts of Japan, Publication No. 2005112250; Publication Date: Apr. 28, 2005 (1 Page).
Patent Abstracts of Japan, Publication No. 2010183755; Publication Date: Aug. 19, 2010 (1 Page).
Patent Abstracts of Japan, Publication No. 2011162065, Publication Date: Aug. 25, 2011 (1 Page).
Patent Abstracts of Japan, Publication No. 2005160284, Publication Date: Jun. 16, 2005 (1 Page).
Notification of Reasons for Refusal issued in corresponding Japanese Application No. 2012-024683, mailed on Dec. 16, 2014 (6 pages).

* cited by examiner

STATE #1

STATE #2

STATE #3

STATE #5

FIG. 8

CONTROL LOGIC

| CPU INPUT | | FIRST SWITCH | SECOND SWITCH | BYPASS RELAY COIL | BYPASS RELAY CONTACT | DC-DC CONVERTER |
|---|---|---|---|---|---|---|
| IGNITION SIGNAL | BOOSTING REQUEST SIGNAL | | | | | |
| NON-EXISTENCE | NON-EXISTENCE | OFF | OFF | NOT-ENERGIZED | ON | NOT-BOOSTED |
| | EXISTENCE | OFF | OFF | NOT-ENERGIZED | ON | NOT-BOOSTED |
| EXISTENCE | NON-EXISTENCE | OFF | OFF | NOT-ENERGIZED | ON | NOT-BOOSTED |
| | EXISTENCE | ON | ON | ENERGIZED | OFF | BOOSTED |

STATE #1

STATE #3

STATE #4

STATE #5

CONTROL LOGIC

| CPU INPUT | | THIRD SWITCH | BYPASS RELAY COIL | BYPASS RELAY CONTACT | DC-DC CONVERTER |
|---|---|---|---|---|---|
| IGNITION SIGNAL | BOOSTING REQUEST SIGNAL | | | | |
| NON-EXISTENCE | NON-EXISTENCE | OFF | NOT-ENERGIZED | ON | NOT-BOOSTED |
| NON-EXISTENCE | EXISTENCE | OFF | NOT-ENERGIZED | ON | NOT-BOOSTED |
| EXISTENCE | NON-EXISTENCE | OFF | NOT-ENERGIZED | ON | NOT-BOOSTED |
| EXISTENCE | EXISTENCE | ON | ENERGIZED | OFF | BOOSTED |

FIG. 16

POWER SUPPLY DEVICE

BACKGROUND OF THE INVENTION

1. Technical Field

The present invention relates to a power-supply device that supplies a voltage at a DC power supply to a load while boosting the voltage.

2. Related Art

Conventionally, various power-supply devices are well known in order to supply a DC voltage to various instruments and circuits, which are mounted on an automobile. For example, each of Japanese Unexamined Patent Publication Nos. 2005-112250, 2010-183755, 2011-162065, and 2005-160284 discloses a power-supply device including a DC-DC converter. The DC-DC converter includes a booster circuit, the booster circuit includes a switching element, a coil, and a capacitor, and the boosted DC voltage is output by switching the voltage at the DC power supply at high speed.

Some automobiles include what is called an idling stop function, in which the automobile automatically tentatively stops an engine when waiting at a stoplight and automatically restarts the engine during starting. In the automobile including the idling stop function, because a large current is passed through a starter motor during the engine restart, a battery voltage drops largely to generate such an abnormal state that the instrument or the circuit is reset. Therefore, it is necessary to boost the battery voltage in order to compensate the voltage drop.

In the power-supply devices disclosed in Japanese Unexamined Patent Publication Nos. 2005-112250, 2010-183755, and 2011-162065, the DC-DC converter is provided between the battery and the load, and a bypass relay constituting a bypass path is provided with respect to the DC-DC converter. The DC voltage is supplied from the battery to the load through the bypass relay during a normal run, and the boosted DC voltage is supplied from the battery to the load through the DC-DC converter during the engine restart. Therefore, the drop of the power supply voltage can be compensated during the engine restart to normally operate the instrument or the circuit, which is of the load.

The power-supply device disclosed in Japanese Unexamined Patent Publication No. 2005-160284 is mounted on an electric automobile, and the DC-DC converter is provided between the battery and an inverter in order to compensate the battery voltage drop due to a back electromotive force generated by the motor during the high-speed rotation of the motor. The bypass relay constituting the bypass path is provided with respect to the DC-DC converter. Whether the DC voltage at the battery is supplied to the load through the bypass relay or the DC-DC converter is switched based on an instruction from a feedback means.

FIG. 17 illustrates an example of the conventional power-supply device including the DC-DC converter. A power-supply device 300 is provided between a battery 1 and a load 2, and includes a DC-DC converter 3 and a bypass relay 20. For example, the load 2 is a vehicle audio instrument or a vehicle interior light. The DC-DC converter 3 includes a main relay 10, a booster circuit 11, an input interface 12, a CPU 13, and a transistor Q. The main relay 10 includes a coil Xa and a contact Ya. The contact Ya is in a normally-opened state. The bypass relay 20 includes a coil Xb and a contact Yb. The contact Yb is in a normally-closed state. An ignition signal from an ignition switch SW and a boosting request signal from a boosting request signal generator 4 are input to the CPU 13 through the input interface 12. For example, the boosting request signal generator 4 is an idling stop Electronic Control Unit (ECU).

While the vehicle runs, the ignition switch SW becomes ON (a closed state), and the H (High)-level ignition signal is input to the CPU 13. When receiving the H-level ignition signal, the CPU 13 controls the transistor Q in an off state. Therefore, the coil Xb of the bypass relay 20 is not energized, but the contact Yb of the bypass relay 20 is ON (the closed state). Accordingly, the DC voltage is supplied from the battery 1 to the load 2 through the contact Yb of the bypass relay 20. On the other hand, because the boosting request signal is not input to the CPU 13 from the boosting request signal generator 4, the CPU 13 does not drive the main relay 10, but the contact Ya of the main relay 10 is OFF (an opened state). Because the CPU 13 does not drive the booster circuit 11, the DC-DC converter 3 does not perform a boosting operation.

When the engine restarts after the vehicle stops to become the idling stop state, the L (Low)-level boosting request signal is input to the CPU 13 from the boosting request signal generator 4. When receiving the L-level boosting request signal, the CPU 13 turns on the transistor Q, energizes the coil Xa of the main relay 10, and drives the booster circuit 11. Because the coil Xb of the bypass relay 20 is energized from the battery 1 by turning on the transistor Q, the contact Yb of the bypass relay 20 becomes OFF. On the other hand, because the coil Xa of the main relay 10 is energized from the battery 1, the contact Ya of the main relay 10 becomes ON. Accordingly, the boosted DC voltage is supplied from the battery 1 to the load 2 through the contact Ya and the booster circuit 11.

The contact of the relay is roughly divided into a normally-opened contact and a normally-closed contact. The normally-opened contact is opened when the coil is not energized, and the normally-opened contact is closed when the coil is energized. On the other hand, the normally-closed contact is closed when the coil is not energized, and the normally-closed contact is opened when the coil is energized. In the power-supply device 300 in FIG. 17, the contact Yb of the bypass relay 20 is the normally-closed contact. This is because, in the case that the load 2 is the audio instrument or the vehicle interior light, it is necessary to drive the load 2 even if the ignition signal is not output while the vehicle is in the stopped state.

However, in the case that the contact Yb of the bypass relay 20 is the normally-closed contact, the coil Xb of the bypass relay 20 is energized to open the contact Yb when the transistor Q is turned on due to the breakdown of the CPU 13 or the transistor Q. Therefore, unfortunately the voltage is not supplied from the battery 1 to the load 2, and the load 2 cannot be driven.

SUMMARY

An object of the present invention is to provide a power-supply device, which can continuously supply the voltage from the power supply to the load even if the breakdown of the circuit is generated.

In accordance with one aspect of the present invention, a power-supply device includes: a booster circuit that is provided between a DC power supply and a load, the booster circuit supplying a voltage at the DC power supply to the load while boosting the voltage; a bypass element that is provided between the DC power supply and the load, the bypass element constituting a bypass path with respect to the booster circuit; a controller that, based on externally-input first and second signals, outputs a switching signal while controlling an operation of the booster circuit; and a switching circuit that switches a state of the bypass element based on the switching signal and the second signal. The switching circuit switches the state of the bypass element such that the voltage is supplied from the DC power supply to the load through the bypass element when one of or both the switching signal and the second signal are not input, and the switching circuit switches the state of the bypass element such that the voltage is supplied from the DC power supply to the load through the booster circuit when both the switching signal and the second signal are input.

According to the above configuration, only when both the switching signal and the second signal are input to the switching circuit, the switching circuit switches the voltage supply path to the load from the bypass element side to the booster circuit side. While the voltage is supplied to the load through the bypass element, even if the circuit is broken down to input one of the switching signal and the second signal to the switching circuit due to a malfunction, the switching circuit does not switch the state of the bypass element unless the other of the switching signal and the second signal is input. Therefore, the bypass element is maintained in the operating state, the voltage can continuously be supplied from the DC power supply to the load.

In the present invention, the bypass element may be constructed by a normally-closed bypass relay that includes a coil and a contact, and the switching circuit may include a first switch that is connected in series with the coil of the bypass relay and a second switch that is connected in series with the first switch. In this case, the first switch is turned on based on the switching signal, and the second switch is turned on based on the second signal, whereby the coil of the bypass relay is energized through the first and second switches to open the contact.

In the present invention, the bypass element may be constructed by a normally-closed bypass relay that includes a coil and a contact, and the switching circuit may include a third switch that is connected in series with the coil of the bypass relay and a fourth switch that controls on and off of the third switch. In this case, the fourth switch is turned on or off based on the second signal, the controller outputs the switching signal to turn on the third switch, and the coil of the bypass relay is energized through the third switch to open the contact.

In the present invention, the power-supply device may further include a normally-opened main relay that is operated based on the second signal, wherein the contact of the main relay is connected in series with the booster circuit, and the contact of the bypass relay is connected in parallel with the booster circuit and the contact of the main relay.

In the present invention, one end of the coil of the bypass relay may be connected onto an output side of the booster circuit through the switching circuit.

In the present invention, the first signal may be an ignition signal that is generated based on an operation of an ignition switch of a vehicle, and the second signal may be a boosting request signal that is generated when an engine restarts after the vehicle becomes an idling stop state.

According to the present invention, the power-supply device, which can continuously supply the voltage from the power supply to the load even if the breakdown of the circuit is generated, can be provided.

BRIEF DESCRIPTION OF THE DRAWINGS

FIG. 8 is a table illustrating control logic of the first embodiment;

FIG. 16 is a table illustrating control logic of the second embodiment; and

DETAILED DESCRIPTION

Figure 1:
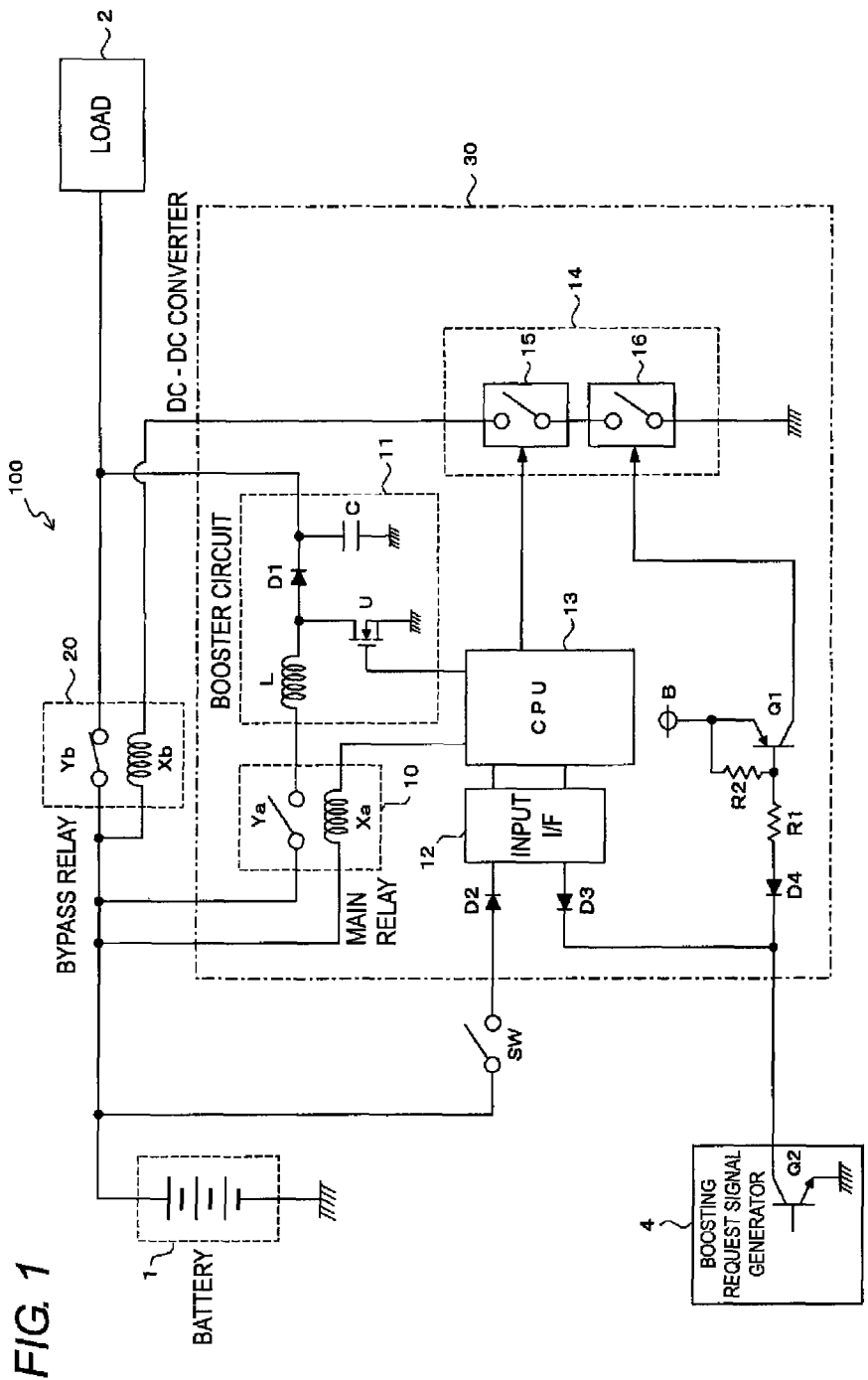
FIG. 1 is a circuit diagram of a power-supply device according to a first embodiment of the invention.

Hereinafter, embodiments of the invention will be described with reference to the drawings. In the following drawings, the same or equivalent component is designated by the same numeral.

A configuration of a power-supply device according to a first embodiment of the present invention will be described with reference to FIG. 1. A power-supply device 100 is provided between a battery 1 and a load 2, and includes a bypass relay 20 and a DC-DC converter 30. In the first embodiment, the battery 1 is a DC power supply that is mounted on an automobile, and the load 2 is a vehicle audio instrument or a vehicle interior light.

The bypass relay 20 is a normally-closed relay, and includes a coil Xb and a contact Yb. One end of the coil Xb is connected to a positive electrode of the battery 1, and the other end is connected to the DC-DC converter 30. One end of the contact Yb is connected to the positive electrode of the battery 1, and the other end is connected to the load 2. A negative electrode of the battery 1 is grounded.

The DC-DC converter 30 includes a main relay 10, a booster circuit 11, an input interface 12, a CPU 13, and a switching circuit 14. The switching circuit 14 includes a first switch 15 and a second switch 16. For example, the switches 15 and 16 are constructed by a transistor or an FET. The first switch 15 is connected in series with the coil Xb of the bypass relay 20, and the second switch 16 is connected in series with the first switch 15. One end of the second switch 16 is grounded.

The booster circuit 11 is a well-known circuit including a switching element U that performs an on-off operation, a boosting coil L, a rectifying diode D1, and a smoothing capacitor C. For example, the switching element U is constructed by a MOS-FET, and performs a switching operation in response to a control signal output from the CPU 13. A high voltage that is generated in the coil L by the on-off operation of the switching element U is rectified by the diode D1, smoothed by the capacitor C, and supplied to the load 2 as a boosted DC voltage.

The main relay 10 is a normally-opened relay, and includes a coil Xa and a contact Ya. One end of the coil Xa is connected to a positive electrode of the battery 1, and the other end is connected to the CPU 13. One end of the contact Ya is connected to the positive electrode of the battery 1, and the other end is connected to one end of the coil L of the booster circuit 11. The other end of the coil L is connected to the load 2 through the diode D1.

Accordingly, in the configuration in FIG. 1, the booster circuit 11 and the contact Ya of the main relay 10 are connected in series between the battery 1 and the load 2, and the contact Yb of the bypass relay 20 is connected in parallel with the booster circuit 11 and the contact Ya of the main relay 10.

An ignition switch SW is provided between the battery 1 and the DC-DC converter 30. One end of the ignition switch SW is connected to the positive electrode of the battery 1. The other end of the ignition switch SW is connected to the input interface 12 through the diode D2.

In the first embodiment, a boosting request signal generator 4 is an idling stop ECU. A brake signal or a vehicle speed signal is input to the boosting request signal generator 4 from a brake switch (not illustrated) or a vehicle speed sensor (not illustrated). An output transistor Q2 included in the boosting request signal generator 4 performs the on-off operation in response to the brake signal or the vehicle speed signal. An output of the boosting request signal generator 4 is provided to the input interface 12 through the diode D3, and provided to a base of a transistor Q1 through a diode D4 and a resistor R1. A collector of the transistor Q1 is connected to the second switch 16. A DC voltage B is supplied from the battery 1 to an emitter of the transistor Q1. A resistor R2 is connected between the base and the emitter of the transistor Q1.

The input interface 12 is provided on an input side of the CPU 13, and provides an ignition signal (first signal) input from the ignition switch SW and a boosting request signal (second signal) input from the boosting request signal generator 4 to the CPU 13. The CPU 13 controls the main relay 10, the booster circuit 11, and the first switch 15 based on the ignition signal and the boosting request signal.

The bypass relay 20 is an example of the "bypass element" of the present invention, and the CPU 13 is an example of the "controller" of the present invention.

An operation of the power-supply device 100 having the above configuration will be described below with reference to FIGS. 2 to 6. Hereinafter, for the ignition switch SW, the contact Ya of the main relay 10, the contact Yb of the bypass relay 20, the first switch 15, and the second switch 16, the closed state of the contact is referred to as "ON" and the opened state of the contact is referred to as "OFF".

Figure 2:
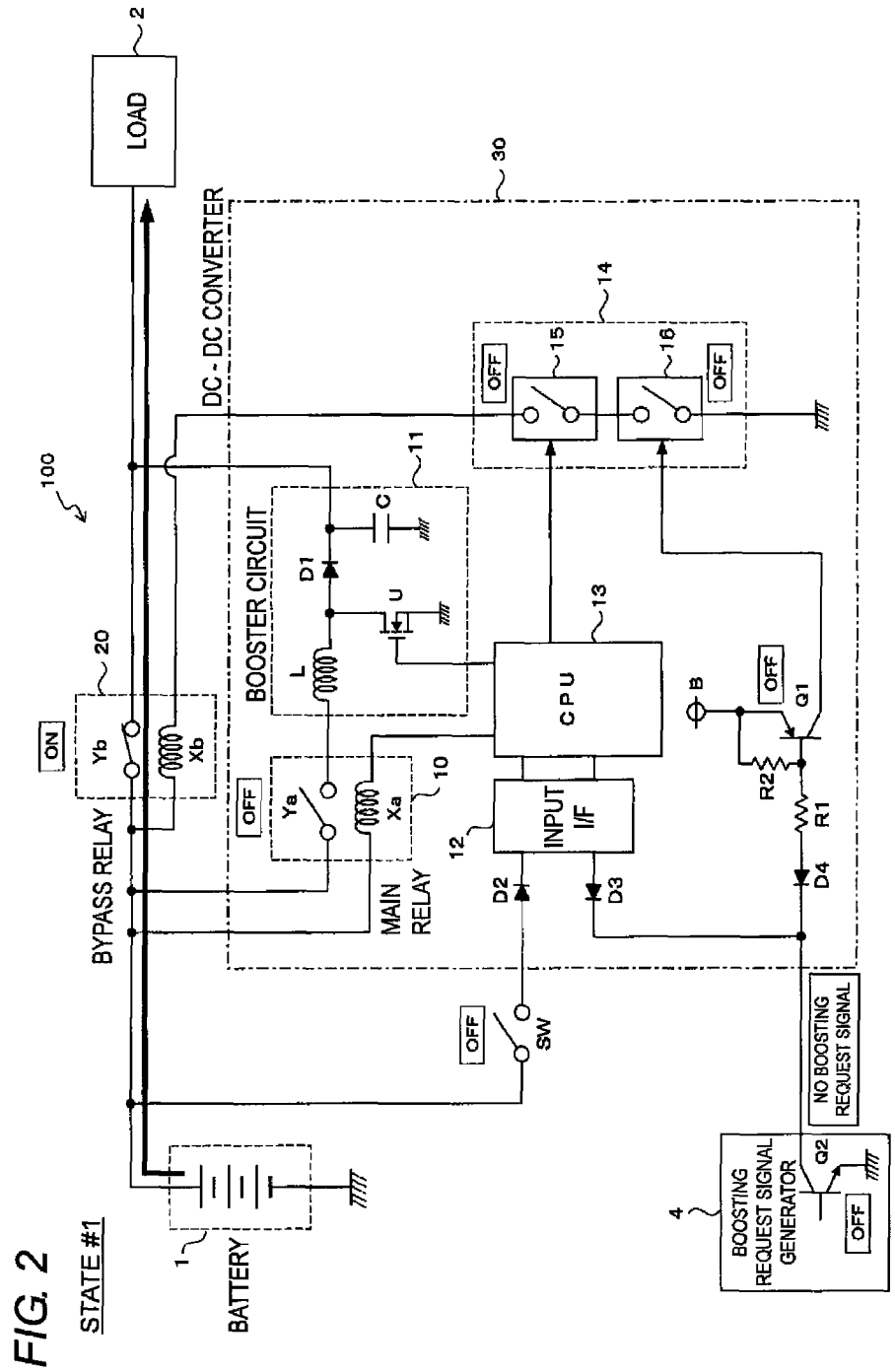
FIG. 2 is a circuit diagram when the power-supply device of the first embodiment is in a state #1.

In the case that the vehicle is stopped, the power-supply device 100 is in a state #1 in FIG. 2. That is, the ignition switch SW is OFF, and the ignition signal is not input to the DC-DC converter 30. Because the output transistor Q2 of the boosting request signal generator 4 is also turned off, the boosting request signal is not input to the DC-DC converter 30.

At this point, the CPU 13 does not drive the main relay 10, the booster circuit 11, and the first switch 15. Therefore, the contact Ya of the main relay 10 is OFF, the booster circuit 11 is in a not-boosted state, and the first switch 15 is OFF. The transistor Q1 is turned off because the output transistor Q2 of the boosting request signal generator 4 is turned off, and the second switch 16 is OFF because a driving signal is not provided to the second switch 16. Accordingly, the contact Yb of the bypass relay 20 is ON because the coil Xb of the bypass relay 20 is not energized. As a result, as indicated by a bold arrow in FIG. 2, a current path from the battery 1 to the load 2 through the contact Yb of the bypass relay 20 is formed, and a voltage at the battery 1 is supplied to the load 2 without passing through the DC-DC converter 30.

Figure 3:
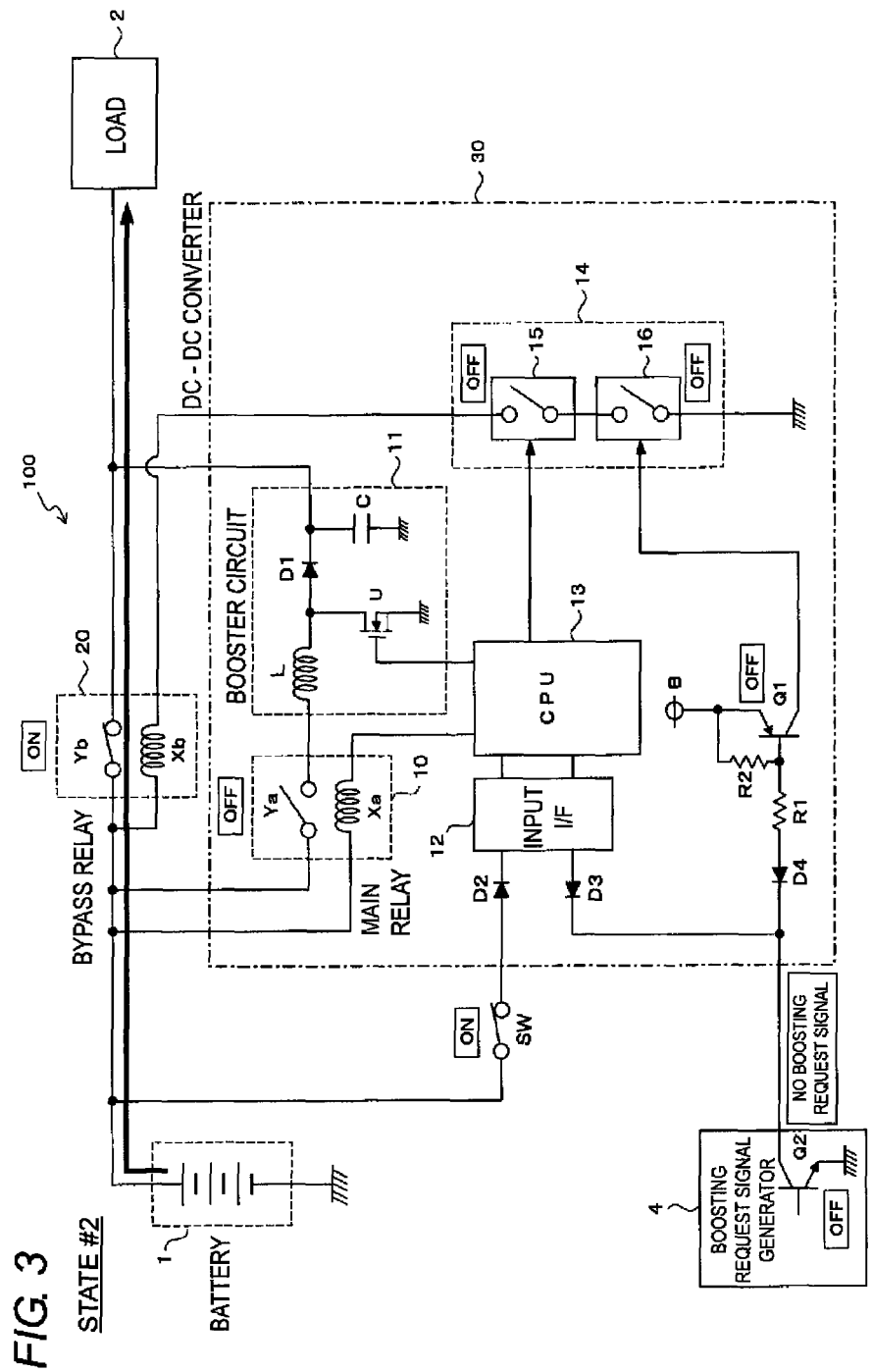
FIG. 3 is a circuit diagram when the power-supply device of the first embodiment is in a state #2.

In the case that the vehicle is running, the power-supply device 100 is in a state #2 in FIG. 3. That is, the ignition switch SW is ON, and an H (High)-level ignition signal is input from the battery 1 to the DC-DC converter 30 through the ignition switch SW. The ignition signal is provided to the CPU 13 through the diode D2 and the input interface 12. On the other hand, because the output transistor Q2 of the boosting request signal generator 4 is turned off, the boosting request signal is not input to the DC-DC converter 30.

At this point, the CPU 13 does not drive the main relay 10, the booster circuit 11, and the first switch 15 even if the ignition signal from the ignition switch SW is input to the CPU 13 through the input interface 12. Therefore, the contact Ya of the main relay 10 is OFF, the booster circuit 11 is in the not-boosted state, and the first switch 15 is OFF. That is, the state #2 in FIG. 3 is identical to the state #1 in FIG. 2 except that the ignition switch SW is ON.

In the case that the vehicle becomes an idling stop state when waiting at a stoplight, the state #2 in FIG. 3 is maintained until the idling stop is released.

Figure 4:
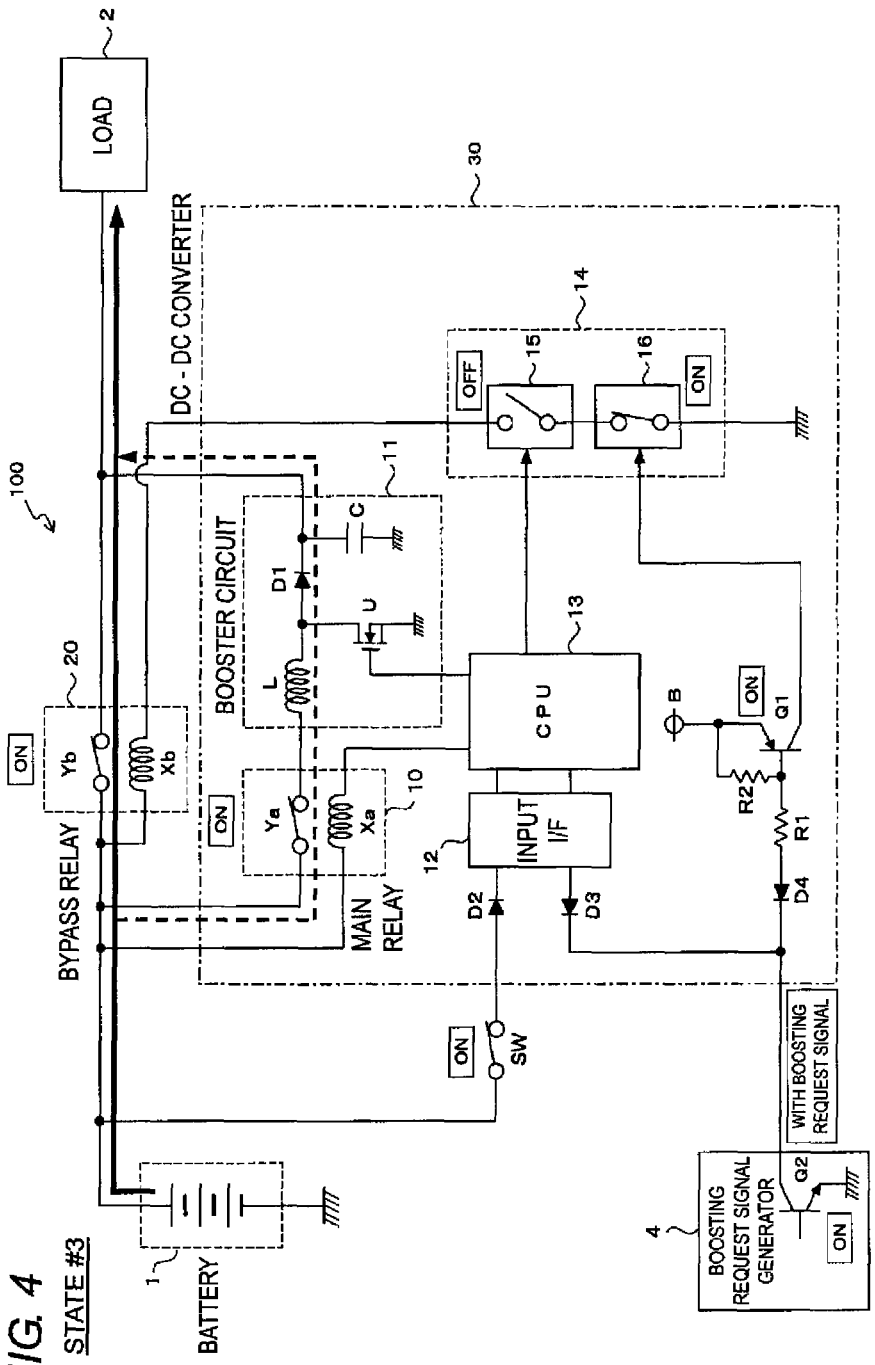
FIG. 4 is a circuit diagram when the power-supply device of the first embodiment is in a state #3.
Figure 5:
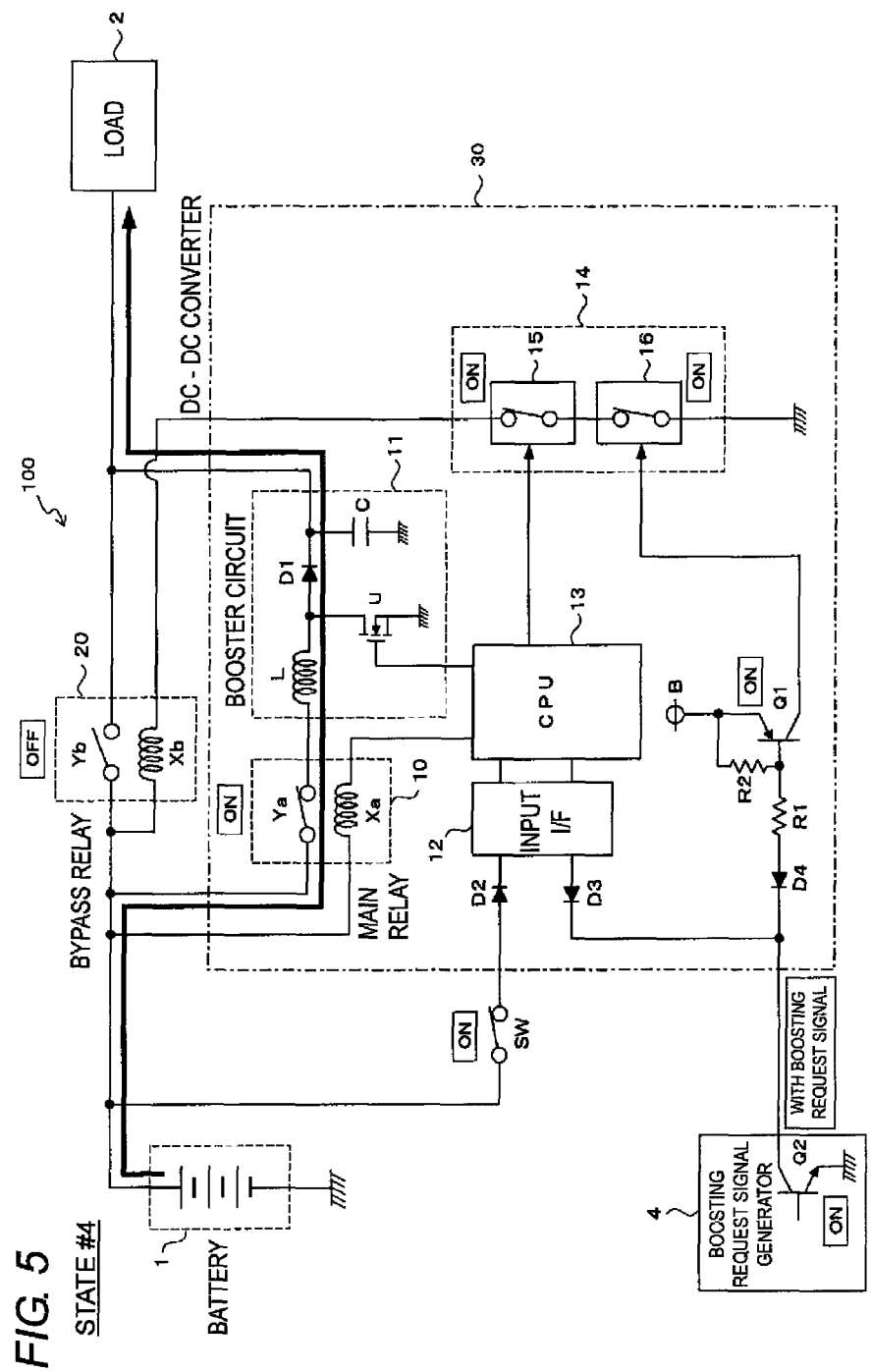
FIG. 5 is a circuit diagram when the power-supply device of the first embodiment is in a state #4.

When the idling stop is released to restart an engine after the vehicle becomes the idling stop state, the power-supply device 100 transitions to a state #4 in FIG. 5 after tentatively becoming a state #3 in FIG. 4. The state #3 in FIG. 4 will be described. When the engine is restarted after the idling stop, the output transistor Q2 of the boosting request signal generator 4 is turned on, the boosting request signal generator 4 outputs an L (Low)-level boosting request signal. The boosting request signal is provided to the CPU 13 through the diode D3 and the input interface 12, and provided to the base of the transistor Q1 through the diode D4 and the resistor R1. On the other hand, the ignition switch SW remains in ON.

The transistor Q1 becomes ON because the base of the transistor Q1 is put into a low potential by the boosting request signal. Therefore, the boosting request signal is inverted into the H-level by the transistor Q1, and provided to the second switch 16, whereby the second switch 16 is ON. On the other hand, in response to the boosting request signal, the CPU 13 outputs a switching signal to the first switch 15 while being late by a time slightly longer than a time (hereinafter referred to as an "input fixed time") from when the boosting request signal is input to when the signal input is fixed in the CPU 13. Accordingly, the first switch 15 does not instantaneously become ON. Therefore, the coil Xb of the bypass relay 20 is not energized, but the contact Yb remains in ON to maintain the current path indicated by the bold arrow in FIG. 4.

In response to the boosting request signal, the CPU 13 drives the main relay 10 while being late by the input fixed time. As a result, the coil Xa of the main relay 10 is energized from the battery 1, and the contact Ya becomes ON. At this point, the booster circuit 11 maintains the not-boosted state because the CPU 13 does not drive the booster circuit 11.

As described above, both the contact Yb of the bypass relay 20 and the contact Ya of the main relay 10 tentatively become ON in the state #3 in FIG. 4. As a result, the current path (a solid-line arrow) from the battery 1 to the load 2 through the contact Yb and the current path (a broken-line arrow) from the battery 1 to the load 2 through the contact Ya, the coil L, and the diode D1 are formed.

Then, when the first switch 15 becomes ON by the switching signal output from the CPU 13, the power-supply device 100 becomes the state #4 in FIG. 5. At this point, because both the first switch 15 and the second switch 16 are ON, the coil Xb of the bypass relay 20 is energized from the battery 1, and the contact Yb of the bypass relay 20 becomes OFF. The CPU 13 drives the switching element U of the booster circuit 11 while turning on the first switch 15, whereby the booster circuit 11 is operated to become a boosted state. As a result, as indicated by the bold arrow in FIG. 5, the current path from the battery 1 to the load 2 through the DC-DC converter 30 is formed, and the voltage at the battery 1 is supplied to the load 2 while boosted by the booster circuit 11. Therefore, a voltage drop of the battery 1 is compensated during the engine restart.

Figure 6:
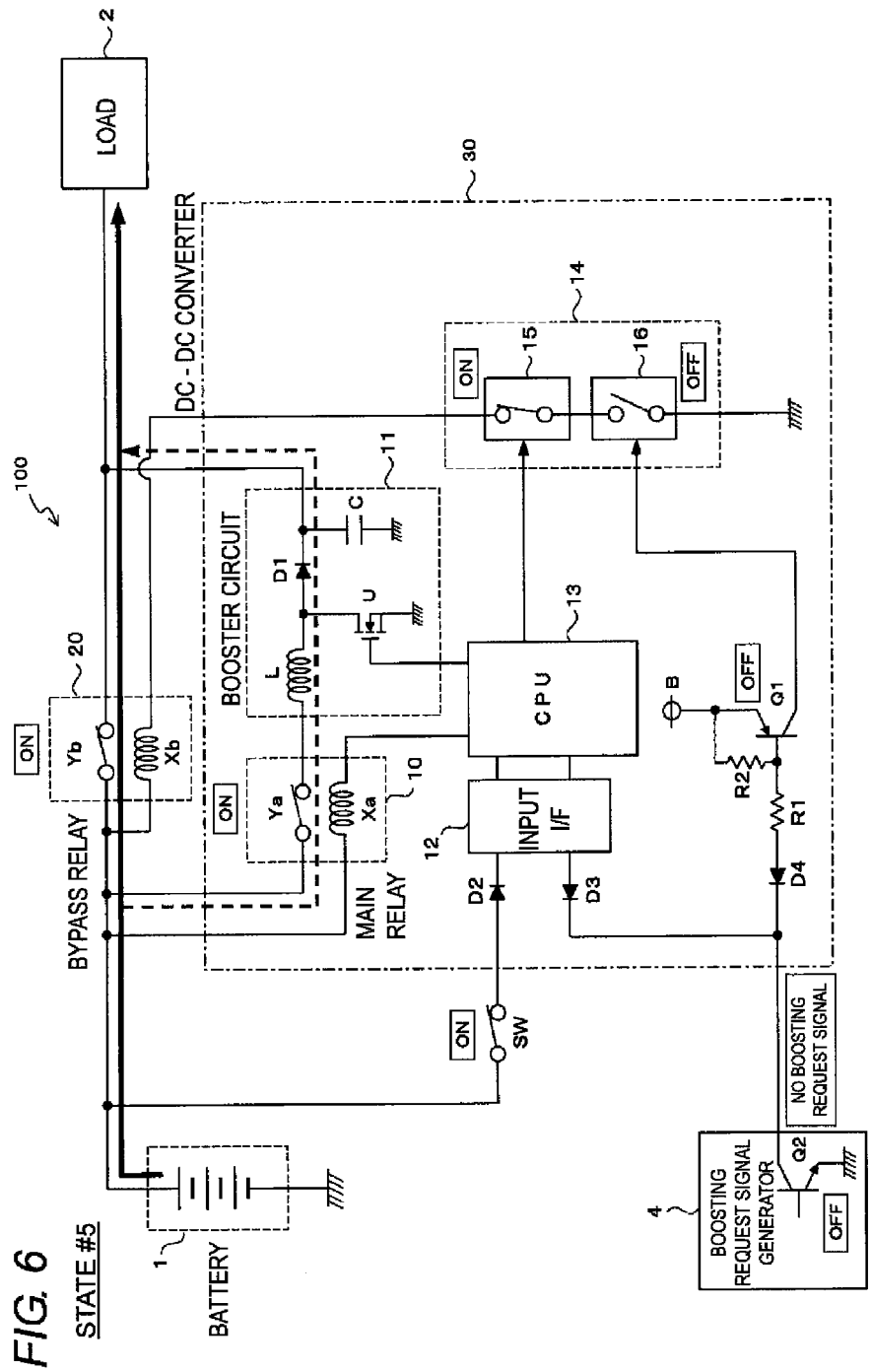
FIG. 6 is a circuit diagram when the power-supply device of the first embodiment is in a state #5.

When the vehicle becomes a normal running state after the engine is restarted, the power-supply device 100 makes a transition to the state #2 in FIG. 3 after a tentative state #5 in FIG. 6. In the normal running state, the output transistor Q2 of the boosting request signal generator 4 is turned off, but the boosting request signal generator 4 does not output the boosting request signal. As illustrated in FIG. 6, the transistor Q1 is turned off and the second switch 16 is OFF. Therefore, the contact Yb of the bypass relay 20 becomes ON because the coil Xb of the bypass relay 20 is not energized. In response to the elimination of the boosting request signal, the CPU 13 stops the main relay 10, the booster circuit 11, and the first switch 15. In this case, the CPU 13 puts the booster circuit 11 into the not-boosted state while being late by the input fixed time. The CPU 13 stops the energization of the coil Xa of the main relay 10 while being late by the time slightly longer than the input fixed time, and the CPU 13 stops the output of the switching signal to the first switch 15. Therefore, the contact Ya of the main relay 10 and the first switch 15 do not instantaneously become OFF.

Accordingly, both the contact Yb of the bypass relay 20 and the contact Ya of the main relay 10 tentatively become ON in the state #5 in FIG. 6. As a result, the current path (the solid-line arrow) from the battery 1 to the load 2 through the contact Yb and the current path (the broken-line arrow) from the battery 1 to the load 2 through the contact Ya, the coil L, and the diode D1 are formed.

Then, when the contact Ya of the main relay 10 and the first switch 15 are OFF, the power-supply device 100 becomes the state #2 in FIG. 3, the voltage at the battery 1 is directly supplied to the load 2 through the contact Yb of the bypass relay 20 without passing through the DC-DC converter 30.

When the vehicle stops, the ignition switch SW becomes OFF and the power-supply device 100 makes the transition to the state #1 in FIG. 2.

As described above, the power-supply device 100 makes the transition among the states #1 to #5 according to the state of the vehicle.

Figure 7:
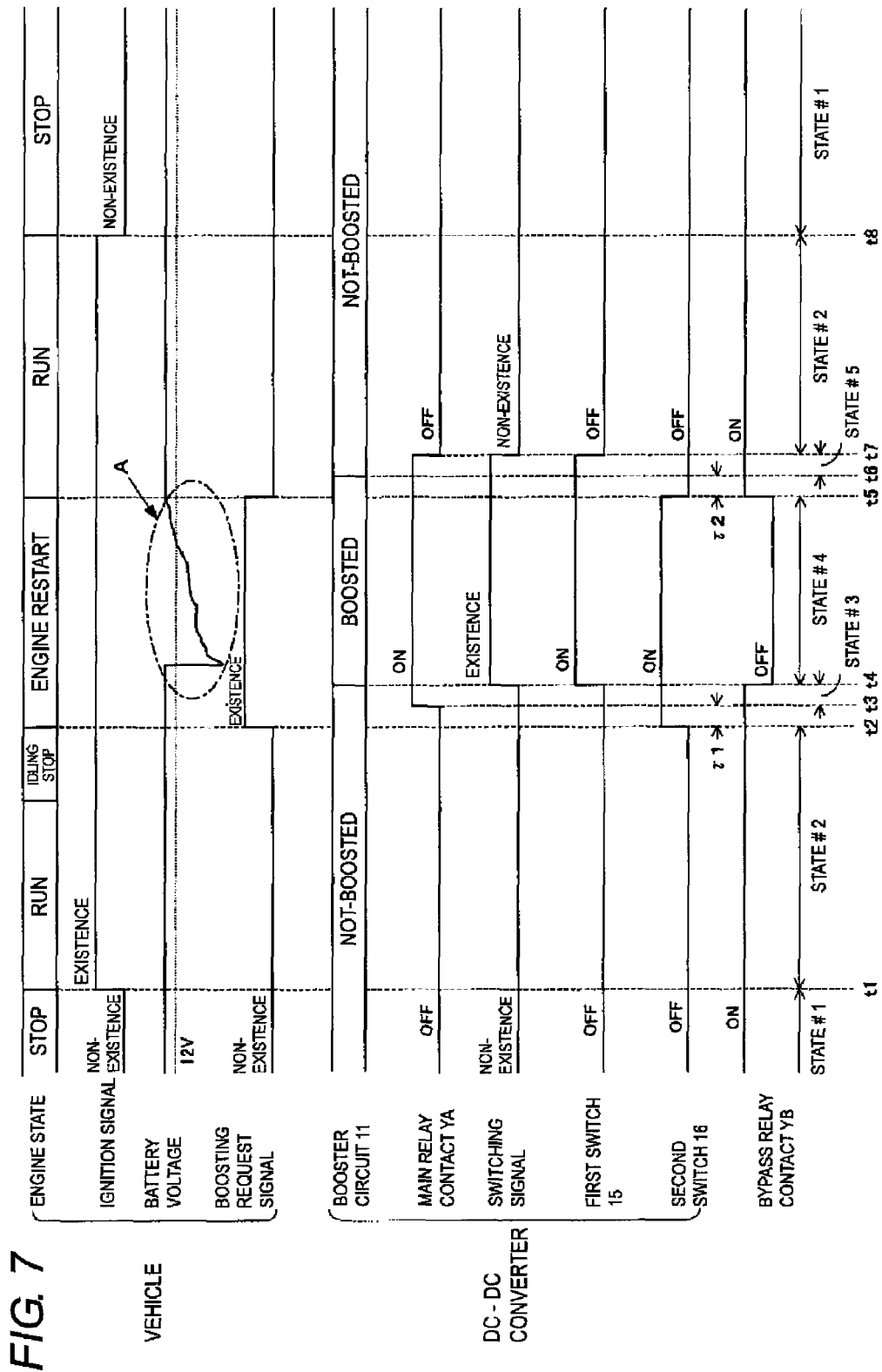
FIG. 7 is a timing chart illustrating an operation of the power-supply device of the first embodiment.

FIG. 7 is a timing chart illustrating the above operation of the power-supply device 100.

Until a clock time t1, the vehicle is in a stopped state. At this point, the ignition switch SW does not output the ignition signal, and the boosting request signal generator 4 does not output the boosting request signal. Therefore, the booster circuit 11 is in the not-boosted state. The CPU 13 does not output the switching signal, the contact Ya of the main relay 10, the first switch 15, and the second switch 16 are OFF, and the contact Yb of the bypass relay 20 is ON (the state #1 in FIG. 2).

At the clock time t1, when the ignition switch SW becomes ON to start the run of the vehicle, the ignition signal is input to the DC-DC converter 30. However, the main relay 10, the first switch 15, the second switch 16, and the bypass relay 20 maintain the states, and the booster circuit 11 also maintains the not-boosted state (the state #2 in FIG. 3). The state #2 in FIG. 3 is maintained even if the vehicle becomes the idling stop state.

At a clock time t2, when the idling stop is released to restart the engine, the boosting request signal generator 4 outputs the boosting request signal. The boosting request signal turns on the transistor Q1, and the second switch 16 becomes ON. At a clock time t3, the contact Ya of the main relay 10 becomes ON while being late by an input fixed time T1 (the state #3 in FIG. 4).

At a clock time t4, the CPU 13 outputs the switching signal, the first switch 15 becomes ON, and both the first switch 15 and the second switch 16 become ON. As a result, the coil Xb of the bypass relay 20 is energized from the battery 1, and the contact Yb becomes OFF. The booster circuit 11 is driven by the CPU 13 to become the boosted state. Therefore, the voltage is supplied from the battery 1 to the load 2 through the DC-DC converter 30 (the state #4 in FIG. 5). Accordingly, as indicated by an alternate long and short dash line (a portion A) in FIG. 7, the voltage at the battery 1, which drops to 12 [V] or less by the engine restart, is boosted by the DC-DC converter 30 and recovered to an original level of 12 [V] or more.

At a clock time t5, when the vehicle becomes the normal running state, the boosting request signal generator 4 does not output the boosting request signal, the transistor Q1 is turned off, and the second switch 16 also becomes OFF. Therefore, the coil Xb of the bypass relay 20 is not energized, but the contact Yb becomes ON. Then, at a clock time t6 after an input fixed time T2 elapses, the booster circuit 11 becomes the not-boosted state (the state #5 in FIG. 6).

At a clock time t7, the CPU 13 does not output the switching signal, but the contact Ya of the main relay 10 becomes OFF while the first switch 15 becomes OFF. Therefore, the voltage is supplied from the battery 1 to the load 2 through the contact Yb of the bypass relay 20 (the state #2 in FIG. 3).

At a clock time t8, when the vehicle stops, the ignition signal is not output. However, the main relay 10, the first switch 15, the second switch 16, and the bypass relay 20 maintain the states, and the booster circuit 11 also maintains the not-boosted state (the state #1 in FIG. 2).

FIG. 8 is a table illustrating control logic in the above operation.

According to the first embodiment, only when both the switching signal from the CPU 13 and the boosting request signal from the boosting request signal generator 4 are input to the switching circuit 14, both the first switch 15 and the second switch 16 become ON to energize the coil Xb of the bypass relay 20, and the contact Yb becomes OFF. Even if one of the first switch 15 and the second switch 16 becomes ON by a malfunction caused by breakdown of the circuit or breakdown of the element itself, the coil Xb of the bypass relay 20 is not energized as long as the other of the first switch 15 and the second switch 16 is OFF, but the contact Yb does not become OFF. Therefore, the situation that the voltage supply from the battery 1 to the load 2 is cut can be avoided to continue the energization of the load 2.

In the first embodiment, the first switch 15 is turned on and off by the switching signal, which is output from the CPU 13 based on the ignition signal and the boosting request signal, and the second switch 16 is turned on and off by the boosting request signal without passing through the CPU 13. Therefore, the second switch 16 maintains the off state even if the CPU 13 breaks down to turn on the first switch 15 due to the malfunction. Accordingly, the voltage can be supplied from the battery 1 to the load 2 without an influence of the breakdown of the CPU 13.

A second embodiment of the present invention will be described below with reference to FIGS. 9 to 16. A configuration of a power-supply device 200 of the second embodiment will be described with reference to FIG. 9.

Figure 9:
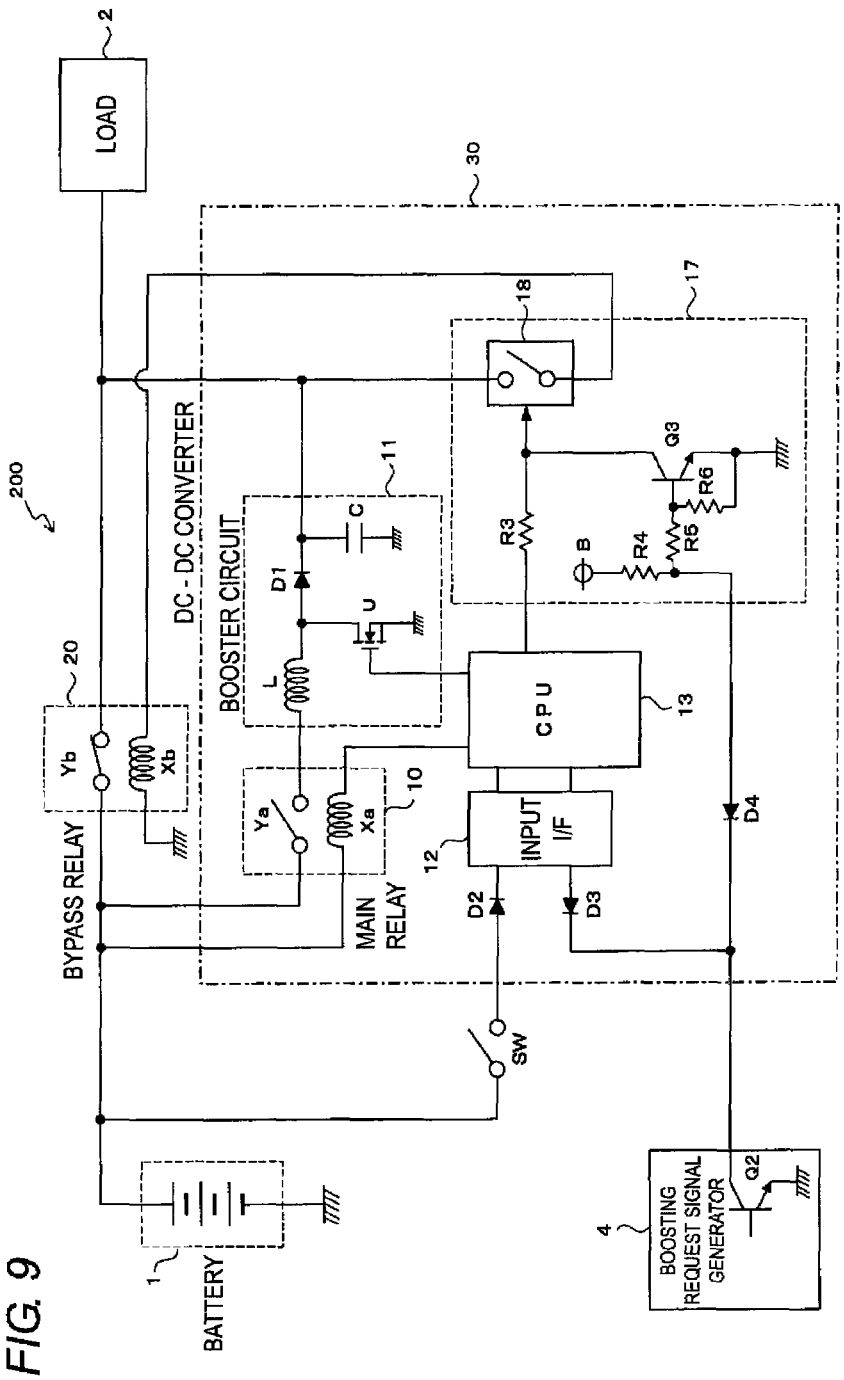
FIG. 9 is a circuit diagram of a power-supply device according to a second embodiment of the invention.

Referring to FIG. 9, a switching circuit 17 is provided instead of the switching circuit 14 in FIG. 1. The switching circuit 17 includes a third switch 18 that is connected in series with the coil Xb of the bypass relay 20 and a transistor Q3 that controls the on-off operation of the third switch 18. For example, the third switch 18 is constructed by a transistor or an FET. The transistor Q3 corresponds to the fourth switch of the present invention. An FET may be used as the fourth switch.

One end of the third switch 18 is connected to the positive electrode of the battery 1 through the contact Yb of the bypass relay 20, and connected onto the output side of the booster circuit 11. The other end of the third switch 18 is connected to one end of the coil Xb of the bypass relay 20. The other end of the coil Xb is grounded.

The collector of the transistor Q3 is connected to the output of the CPU 13 through a resistor R3, and connected to the input of the third switch 18. The base of the transistor Q3 is connected to the boosting request signal generator 4 through the resistor R5 and the diode D4, and connected to the DC power supply B through a resistor R5 and a resistor R4. The emitter of the transistor Q3 is grounded. A resistor R6 is connected between the base and the emitter of the transistor Q3.

Because other configurations are identical to those in FIG. 1, the same component as that in FIG. 1 is designated by the same numeral, and the description is omitted.

An operation of the power-supply device 200 will be described below with reference to FIGS. 10 to 14. Hereinafter, for the ignition switch SW, the contact Ya of the main relay 10, the contact Yb of the bypass relay 20, and the third switch 18, the closed state of the contact is referred to as "ON" and the opened state of the contact is referred to as "OFF".

Figure 10:
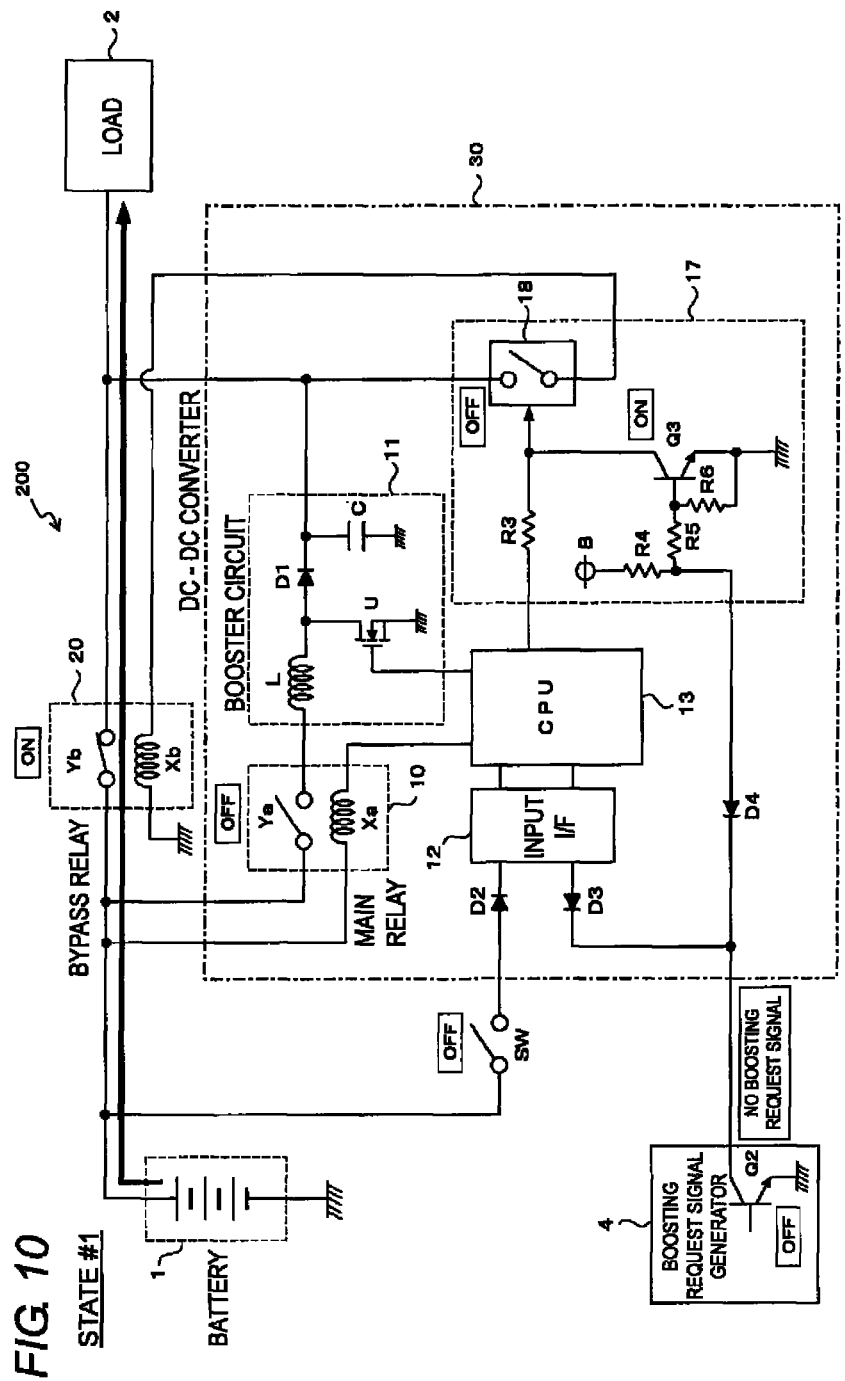
FIG. 10 is a circuit diagram when the power-supply device of the second embodiment is in the state #1.

In the case that the vehicle is stopped, the power-supply device 200 is in a state #1 in FIG. 10. That is, the ignition switch SW is OFF, and the ignition signal is not input to the DC-DC converter 30. Because the output transistor Q2 of the boosting request signal generator 4 is also turned off, the boosting request signal is not input to the DC-DC converter 30.

At this point, the CPU 13 does not drive the main relay 10, the booster circuit 11, and the third switch 18. Therefore, the contact Ya of the main relay 10 is OFF, the booster circuit 11 is in the not-boosted state, and the third switch 18 is OFF. Because the output transistor Q2 of the boosting request signal generator 4 is turned off, the base of the transistor Q3 becomes the high potential, and the transistor Q3 is turned on. Because the third switch 18 is OFF, the coil Xb of the bypass relay 20 is not energized, but the contact Yb of the bypass relay 20 is ON. As a result, as indicated by the bold arrow in FIG. 10, the current path from the battery 1 to the load 2 through the contact Yb of the bypass relay 20 is formed, and the voltage at the battery 1 is supplied to the load 2 without passing through the DC-DC converter 30.

Figure 11:
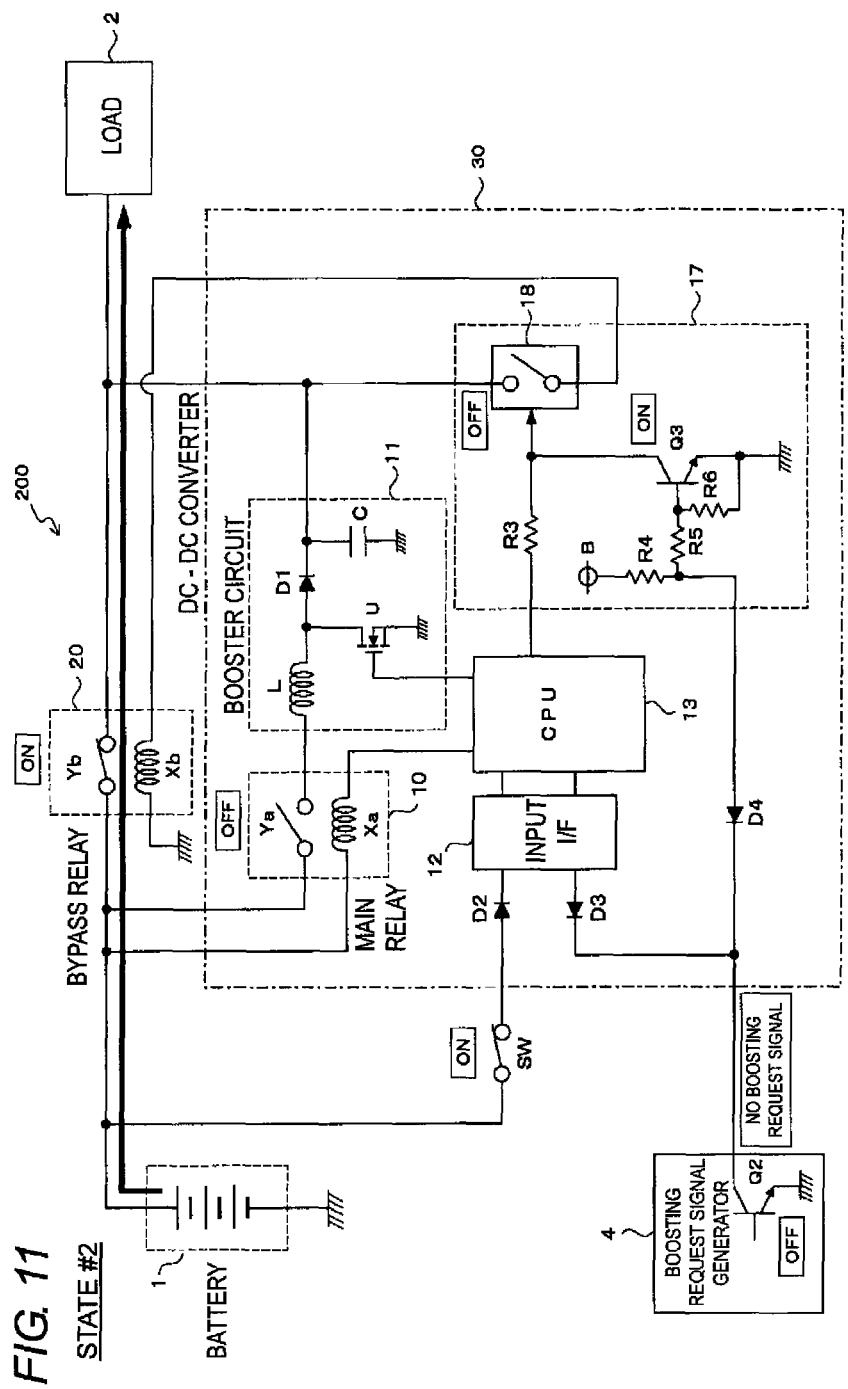
FIG. 11 is a circuit diagram when the power-supply device of the second embodiment is in the state #2.

In the case that the vehicle is running, the power-supply device 200 is in a state #2 in FIG. 11. That is, the ignition switch SW is ON, and the H-level ignition signal is input from the battery 1 to the DC-DC converter 30 through the ignition switch SW. The ignition signal is provided to the CPU 13 through the diode D2 and the input interface 12. On the other hand, because the output transistor Q2 of the boosting request signal generator 4 is turned off, the boosting request signal is not input to the DC-DC converter 30.

At this point, the CPU 13 does not drive the main relay 10, the booster circuit 11, and the third switch 18 even if the ignition signal from the ignition switch SW is input to the CPU 13 through the input interface 12. Therefore, the contact Ya of the main relay 10 is OFF, the booster circuit 11 is in the not-boosted state, and the third switch 18 is OFF. That is, the state #2 in FIG. 11 is identical to the state #1 in FIG. 10 except that the ignition switch SW is ON.

In the case that the vehicle becomes the idling stop state when waiting at the stoplight, the state #2 in FIG. 11 is maintained until the idling stop is released.

Figure 12:
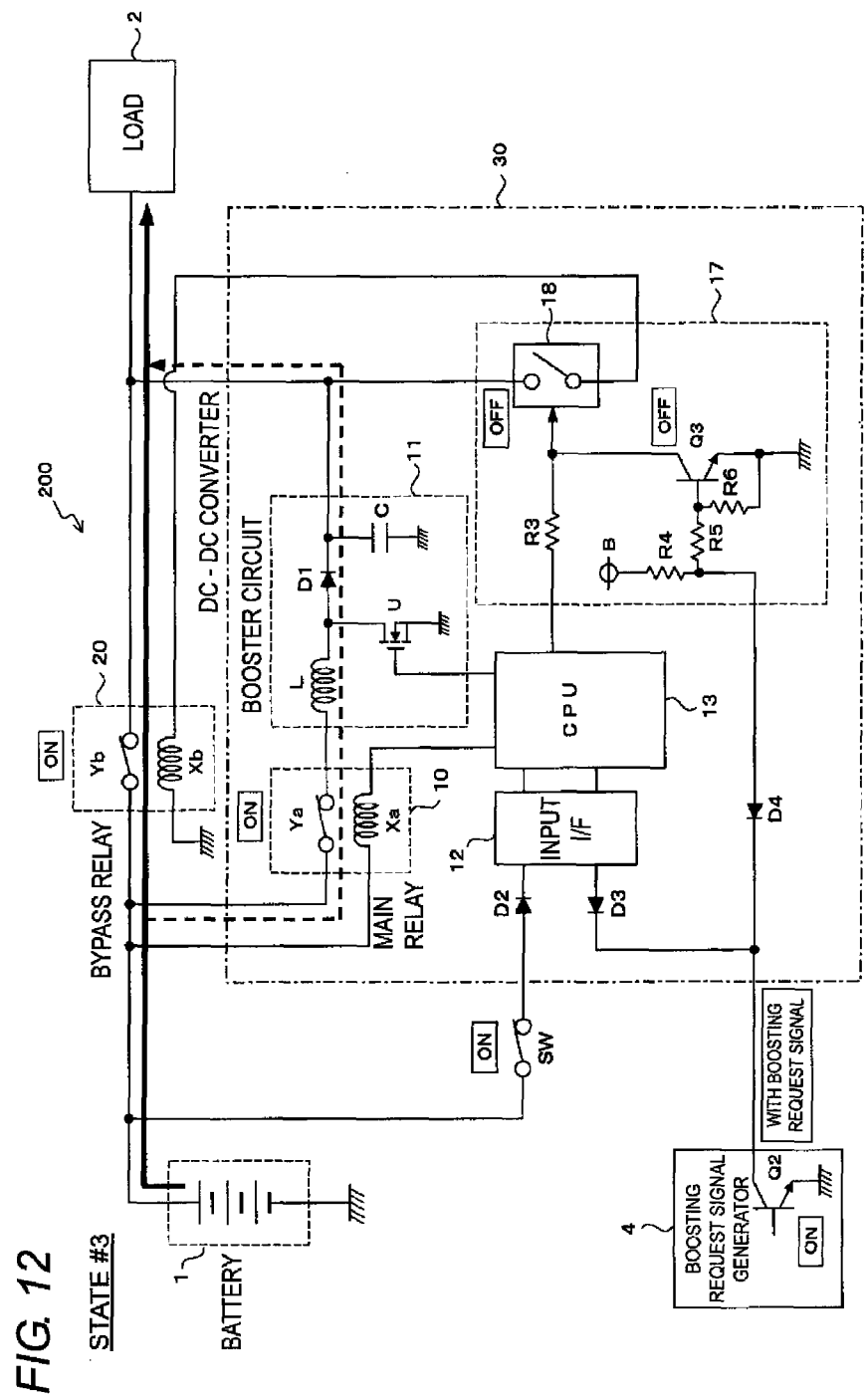
FIG. 12 is a circuit diagram when the power-supply device of the second embodiment is in the state #3.
Figure 13:
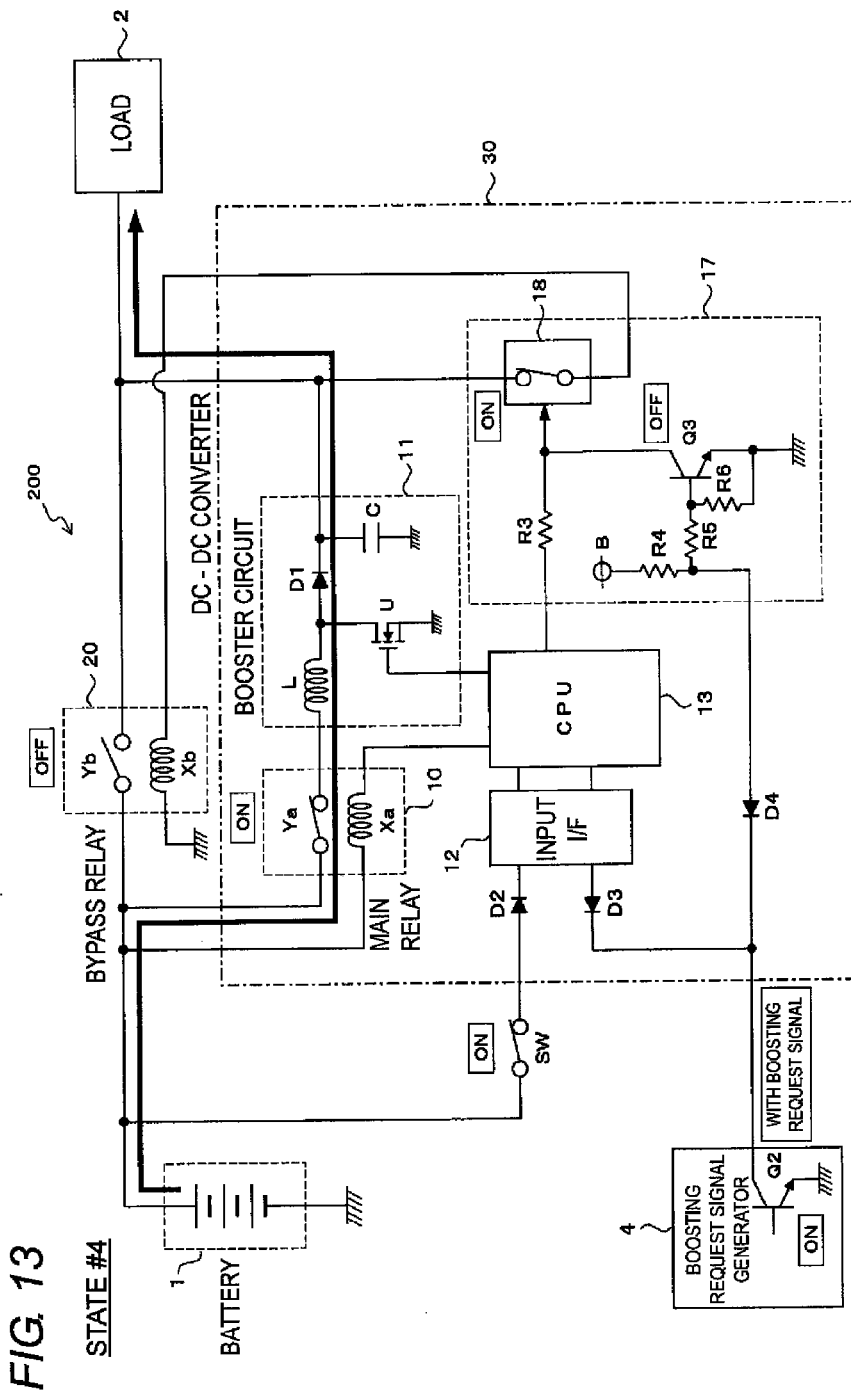
FIG. 13 is a circuit diagram when the power-supply device of the second embodiment is in the state #4.

When the idling stop is released to restart the engine after the vehicle becomes the idling stop state, the power-supply device 200 transitions to a state #4 in FIG. 13 after tentatively becoming a state #3 in FIG. 12. The state #3 in FIG. 12 will be described. When the engine is restarted after the idling stop, the output transistor Q2 of the boosting request signal generator 4 is turned on, the boosting request signal generator 4 outputs the L-level boosting request signal. The boosting request signal is provided to the CPU 13 through the diode D3 and the input interface 12, and provided to the base of the transistor Q3 through the diode D4 and the resistor R5. On the other hand, the ignition switch SW remains in ON.

The transistor Q3 becomes OFF because the base of the transistor Q3 is put into the low potential by the boosting request signal. On the other hand, in response to the boosting request signal, the CPU 13 outputs the switching signal to the third switch 18 while being late by the time slightly longer than the time (the input fixed time) from when the boosting request signal is input to when the signal input is fixed in the CPU 13. Accordingly, the third switch 18 does not instantaneously become ON. Therefore, the coil Xb of the bypass relay 20 is not energized, but the contact Yb remains in ON to maintain the current path indicated by the bold arrow in FIG. 12.

In response to the boosting request signal, the CPU 13 drives the main relay 10 while being late by the input fixed time. As a result, the coil Xa of the main relay 10 is energized from the battery 1, and the contact Ya becomes ON. At this point, the booster circuit 11 maintains the not-boosted state because the CPU 13 does not drive the booster circuit 11.

As described above, both the contact Yb of the bypass relay 20 and the contact Ya of the main relay 10 tentatively become ON in the state #3 in FIG. 12. As a result, the current path (the solid-line arrow) from the battery 1 to the load 2 through the contact Yb and the current path (the broken-line arrow) from the battery 1 to the load 2 through the contact Ya, the coil L, and the diode D1 are formed.

Then, when the third switch 18 becomes ON by the switching signal output from the CPU 13, the power-supply device 200 becomes the state #4 in FIG. 13. At this point, the coil Xb of the bypass relay 20 is energized from the battery 1 through the contact Ya of the main relay 10, the booster circuit 11, and the third switch 18, and the contact Yb of the bypass relay 20 becomes OFF. The CPU 13 drives the switching element U of the booster circuit 11 while turning on the third switch 18, whereby the booster circuit 11 is operated to become the boosted state. As a result, as indicated by the bold arrow in FIG. 13, the current path from the battery 1 to the load 2 through the DC-DC converter 30 is formed, and the voltage at the battery 1 is supplied to the load 2 while boosted by the booster circuit 11. Therefore, the voltage drop of the battery 1 is compensated during the engine restart.

Figure 14:
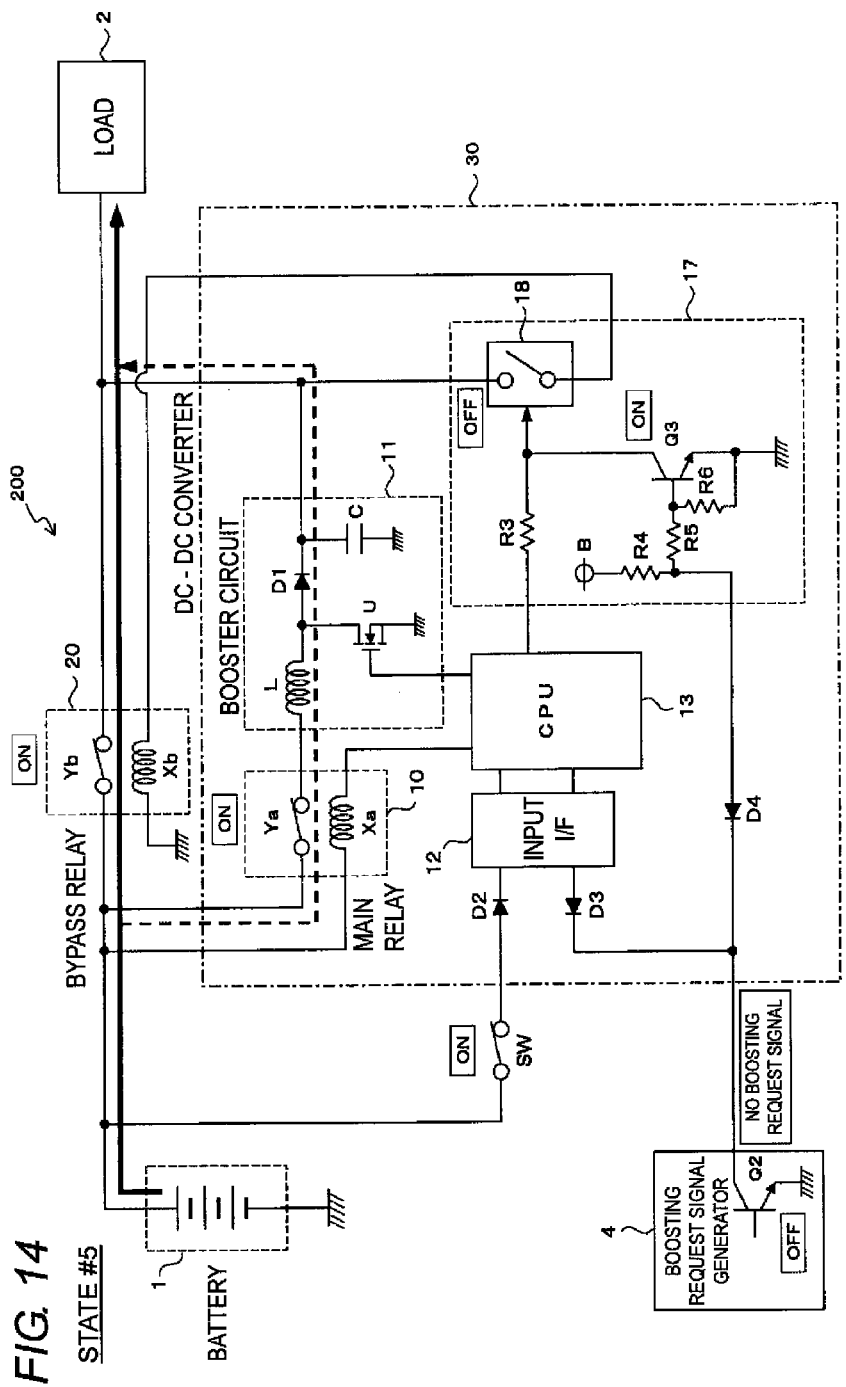
FIG. 14 is a circuit diagram when the power-supply device of the second embodiment is in the state #5.

When the vehicle becomes the normal running state after the engine is restarted, the power-supply device 200 makes the transition to the state #2 in FIG. 11 after a tentative state #5 in FIG. 14. In the normal running state, the output transistor Q2 of the boosting request signal generator 4 is turned off, but the boosting request signal generator 4 does not output the boosting request signal. Therefore, as illustrated in FIG. 14, the transistor Q3 is turned on, but the switching signal from the CPU 13 is not input to the third switch 18. Therefore the third switch 18 becomes OFF. Therefore, the contact Yb of the bypass relay 20 becomes ON because the coil Xb of the bypass relay 20 is not energized. In response to the elimination of the boosting request signal, the CPU 13 stops the main relay 10 and the booster circuit 11. In this case, the CPU 13 puts the booster circuit 11 into the not-boosted state while being late by the input fixed time. The CPU 13 stops the energization of the coil Xa of the main relay 10 while being late by the time slightly longer than the input fixed time. Therefore, the contact Ya of the main relay 10 does not instantaneously become OFF.

Accordingly, both the contact Yb of the bypass relay 20 and the contact Ya of the main relay 10 tentatively become ON in the state #5 in FIG. 14. As a result, the current path (the solid-line arrow) from the battery 1 to the load 2 through the contact Yb and the current path (the broken-line arrow) from the battery 1 to the load 2 through the contact Ya, the coil L, and the diode D1 are formed.

Then, when the contact Ya of the main relay 10 is OFF, the power-supply device 200 becomes the state #2 in FIG. 11, the voltage at the battery 1 is directly supplied to the load 2 through the contact Yb of the bypass relay 20 without passing through the DC-DC converter 30.

When the vehicle stops, the ignition switch SW becomes OFF and the power-supply device 200 makes the transition to the state #1 in FIG. 10.

As described above, the power-supply device 200 makes the transition among the states #1 to #5 according to the state of the vehicle.

Figure 15:
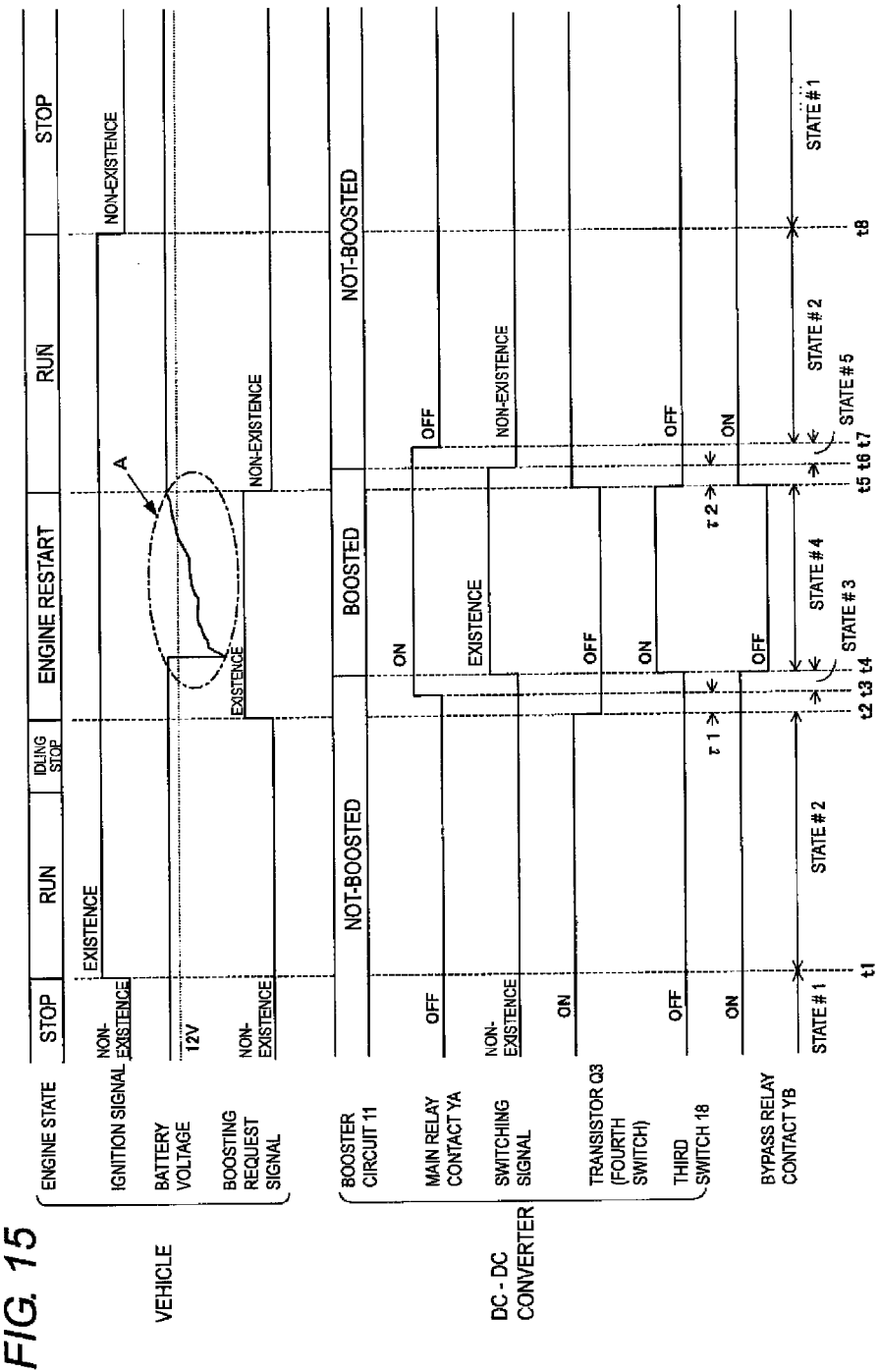
FIG. 15 is a timing chart illustrating an operation of the power-supply device of the second embodiment.
Figure 17:
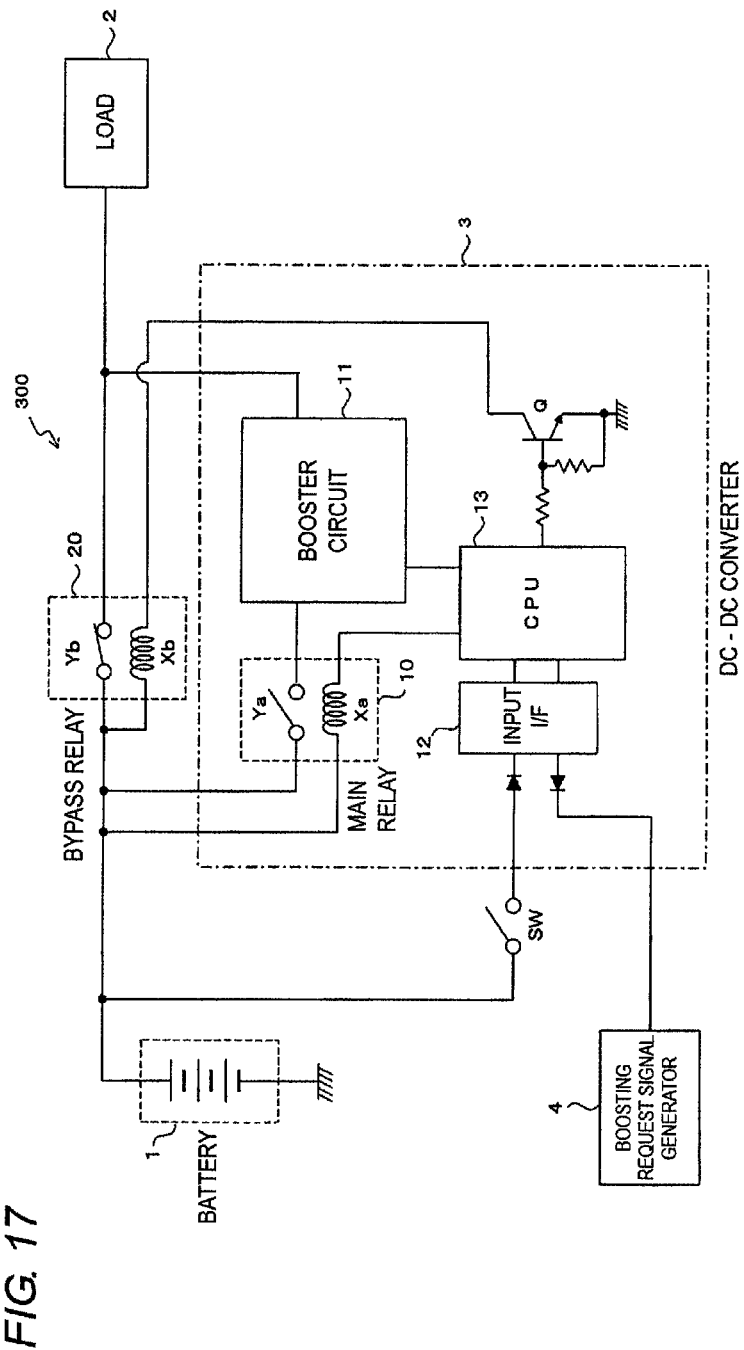
FIG. 17 is a circuit diagram of a conventional power-supply device.

FIG. 15 is a timing chart illustrating the above operation of the power-supply device 200.

Until the clock time t1, the vehicle is in the stopped state. At this point, the ignition switch SW does not output the ignition signal, and the boosting request signal generator 4 does not output the boosting request signal. Therefore, the booster circuit 11 is in the not-boosted state. The CPU 13 does not output the switching signal, both the contact Ya of the main relay 10 and the third switch 18 are OFF, the transistor Q3 (fourth switch) is ON, and the contact Yb of the bypass relay 20 is ON (the state #1 in FIG. 10).

At the clock time t1, when the ignition switch SW becomes ON to start the run of the vehicle, the ignition signal is input to the DC-DC converter 30. However, the main relay 10, the third switch 18, the transistor Q3, and the bypass relay 20 maintain the states, and the booster circuit 11 also maintains the not-boosted state (the state #2 in FIG. 11). The state #2 in FIG. 11 is maintained even if the vehicle becomes the idling stop state.

At the clock time t2, when the idling stop is released to restart the engine, the boosting request signal generator 4 outputs the boosting request signal. The boosting request signal turns off the transistor Q3. At the clock time t3, the contact Ya of the main relay 10 becomes ON while being late by the input fixed time d (the state #3 in FIG. 12).

At the clock time t4, the CPU 13 outputs the switching signal, the third switch 18 becomes ON, the coil Xb of the bypass relay 20 is energized from the battery 1, and the contact Yb becomes OFF. The booster circuit 11 is driven by the CPU 13 to become the boosted state. Therefore, the voltage is supplied from the battery 1 to the load 2 through the DC-DC converter 30 (the state #4 in FIG. 13). Accordingly, as indicated by the alternate long and short dash line (the portion A) in FIG. 15, the voltage at the battery 1, which drops to 12 M or less by the engine restart, is boosted by the DC-DC converter 30 and recovered to the original level of 12 [V] or more.

At the clock time t5, when the vehicle becomes the normal running state, the boosting request signal generator 4 does not output the boosting request signal, and the transistor Q3 is turned on, whereby the third switch 18 becomes OFF. Therefore, the coil Xb of the bypass relay 20 is not energized, but the contact Yb becomes ON. Then, at the clock time t6 after the input fixed time τ2 elapses, the booster circuit 11 becomes the not-boosted state, and the CPU 13 stops the output of the switching signal (the state #5 in FIG. 14).

At the clock time t7, the contact Ya of the main relay 10 becomes OFF, and the voltage is supplied from the battery 1 to the load 2 through the contact Yb of the bypass relay 20 (the state #2 in FIG. 11).

At the clock time t8, when the vehicle stops, the ignition signal is not output. However, the main relay 10, the third switch 18, the transistor Q3, and the bypass relay 20 maintain the states, and the booster circuit 11 also maintains the not-boosted state (the state #1 in FIG. 10).

FIG. 16 is a table illustrating control logic in the above operation.

According to the second embodiment, only when both the switching signal from the CPU 13 and the boosting request signal from the boosting request signal generator 4 are input to the switching circuit 17, the third switch 18 becomes ON to energize the coil Xb of the bypass relay 20, and the contact Yb becomes OFF. Even if the CPU 13 mistakenly outputs the switching signal due to the breakdown of the circuit, the third switch 18 does not become ON unless the boosting request signal generator 4 outputs the boosting request signal. Accordingly, the coil Xb of the bypass relay 20 is not energized, but the contact Yb does not become OFF. Even if the boosting request signal generator 4 mistakenly outputs the boosting request signal, the third switch 18 does not become ON unless the CPU 13 outputs the switching signal. Accordingly, the coil Xb of the bypass relay 20 is not energized, but the contact Yb does not become OFF. As described above, the situation that the voltage supply from the battery 1 to the load 2 is cut can be avoided to continue the energization of the load 2.

In the second embodiment, one end of the coil Xb of the bypass relay 20 is connected onto the output side of the booster circuit 11 through the third switch 18. When the third switch 18 becomes ON, the voltage boosted by the booster circuit 11 is applied to the coil Xb through the third switch 18. Therefore, a current is sufficiently through the coil Xb, the contact Yb of the bypass relay 20 is securely OFF, and the path in which the voltage is supplied to the load 2 can be switched onto the side of the booster circuit 11.

Various modifications can be made in the present invention. For example, in the first embodiment (see FIG. 1), the energization path to the coil Xb of the bypass relay 20 may be configured like the second embodiment (see FIG. 9). Specifically, one end of the coil Xb may be connected onto the output side of the booster circuit 11 through the switching circuit 14 while the other end of the coil Xb is grounded.

In the circuit configuration in FIG. 9, the CPU 13 outputs the switching signal, and the third switch 18 is ON when the transistor Q3 that is of the fourth switch is turned off. Alternatively, the CPU 13 outputs the switching signal, and the third switch 18 may be ON when the transistor that is of the fourth switch is turned on. In this case, a transistor (not illustrated) in which the collector is connected to the resistor R3 while the emitter is connected to the third switch 18 may be provided between the resistor R3 and the third switch 18.

In the embodiments, the bypass relay 20 is used as the bypass element. Alternatively, a large-current opening and closing semiconductor switching element may be used instead of the bypass relay 20. Similarly, instead of the main relay 10, a semiconductor switching element may be used as the element that connects and disconnects the booster circuit 11 to and from the battery 1.

In the embodiments, the power-supply device that supplies the DC voltage to the load mounted on the vehicle is described by way of example. However, the present invention can be applied to other applications.

In the embodiments, by way of example, the drop of the battery voltage is compensated during the engine restart. However, the present invention can be applied in the case that the drop of the battery voltage due to the back electromotive force is compensated during the high-speed rotation of the motor of the electric automobile like Japanese Unexamined Patent Publication No. 2005-160284.

What is claimed is:

1. A power-supply device comprising:
   a booster circuit that is provided between a DC power supply and a load, the booster circuit supplying a voltage from the DC power supply to the load while boosting the voltage;
   a bypass element that is provided between the DC power supply and the load, the bypass element constituting a bypass path with respect to the booster circuit;
   a controller that, based on externally-input first and second signals, outputs a switching signal while controlling an operation of the booster circuit; and
   a switching circuit that switches a state of the bypass element based on the switching signal and the second signal,
   wherein the switching circuit switches the state of the bypass element such that the voltage is supplied from the DC power supply to the load through the bypass element when one or both of the switching signal and the second signal are not input to the switching circuit,
   wherein the switching circuit switches the state of the bypass element such that the voltage is supplied from the DC power supply to the load through the booster circuit when both the switching signal and the second signal are input to the switching circuit,
   wherein the bypass element is a normally-closed bypass relay that includes a coil and a contact,
   wherein the switching circuit comprises:
      a third switch that is connected in series with the coil of the bypass relay, and
      a fourth switch that controls on and off of the third switch, and
   wherein, when the fourth switch is turned on or off based on the second signal and the controller outputs the switching signal, the third switch is turned on, and the coil of the bypass relay is energized through the third switch to open the contact.

2. The power-supply device according to claim 1,
   wherein the first signal is an ignition signal that is generated based on an operation of an ignition switch of a vehicle, and
   wherein the second signal is a boosting request signal that is generated when an engine restarts after the vehicle becomes an idling stop state.

3. The power-supply device according to claim 1, further comprising:
   a normally-opened main relay that is operated based on the second signal,
   wherein the contact of the main relay is connected in series with the booster circuit, and
   wherein the contact of the bypass relay is connected in parallel with the booster circuit and the contact of the main relay.

4. The power-supply device according to claim 1,
   wherein one end of the coil of the bypass relay is connected onto an output side of the booster circuit through the switching circuit.

5. The power-supply device according to claim 3,
   wherein the first signal is an ignition signal that is generated based on an operation of an ignition switch of a vehicle, and
   wherein the second signal is a boosting request signal that is generated when an engine restarts after the vehicle becomes an idling stop state.

6. The power-supply device according to claim 4,
   wherein the first signal is an ignition signal that is generated based on an operation of an ignition switch of a vehicle, and
   wherein the second signal is a boosting request signal that is generated when an engine restarts after the vehicle becomes an idling stop state.

* * * * *